United States Patent
Bohrn et al.

[11] Patent Number: 5,183,704
[45] Date of Patent: Feb. 2, 1993

[54] HIGHLY MICROPOROUS 2:1 LAYERED SILICATE MATERIALS

[75] Inventors: Walter J. Bohrn; Kimberly S. Diffenbaugh; Shelly N. Garman, all of Lancaster, Pa.; Jatin C. Khanpara, St. Joseph, Mich.

[73] Assignee: Armstrong World Industries, Inc., Lancaster, Pa.

[21] Appl. No.: 653,177

[22] Filed: Feb. 11, 1991

[51] Int. Cl.$^5$ .............................................. B32B 3/00
[52] U.S. Cl. .................... 428/305.5; 264/42; 264/83; 264/110; 264/112; 264/DIG. 57; 428/307.3; 428/307.7; 428/316.6; 428/324; 428/331; 428/363; 428/454; 428/920; 501/39; 501/53; 501/84
[58] Field of Search ............... 428/305.5, 307.3, 301.7, 428/316.6, 324, 331, 354, 920, 363, 454; 252/62, 315.5, 315.6; 501/39, 53, 84, 94, 133; 264/30, 42, 82, 83, 110, 112, DIG. 52, DIG. 54, DIG. 57, DIG. 62

[56] References Cited

U.S. PATENT DOCUMENTS

| | | |
|---|---|---|
| 3,928,054 | 12/1975 | Kubo .................................. 106/120 |
| 4,130,687 | 12/1978 | Ballard et al. ....................... 428/310 |
| 4,269,628 | 5/1981 | Ballard et al. ........................ 106/86 |
| 4,395,456 | 7/1983 | Jackson et al. ..................... 428/304.4 |
| 4,442,175 | 4/1984 | Flannery et al. ..................... 428/404 |
| 4,447,491 | 5/1984 | Bradbury et al. ................. 428/304.4 |
| 4,775,586 | 10/1988 | Bohrn et al. ......................... 428/324 |
| 4,877,484 | 10/1989 | Bohrn et al. ......................... 162/103 |
| 4,902,442 | 2/1990 | Garces ............................. 252/313.2 |
| 4,990,405 | 2/1991 | Bohrn et al. ......................... 428/413 |

Primary Examiner—Paul J. Thibodeau
Assistant Examiner—Hoa T. Le

[57] ABSTRACT

Lamellar-structured highly microporous silicate compositions are provided which can be used as insulative articles and insulation material. The silicate is in the form of lamellae selected from the group consisting of mica and vermiculite. The silicate lamellae form the microporous structure, by forming the pore walls with the lamellae. Processes are described which prepare these compositions by removing the water from flocculated or unflocculated aqueous dispersions of chemically delaminated silicates while the arrangement of the lamellae in the dispersion is largely preserved, resulting in the highly microporous lamellar structure.

20 Claims, 3 Drawing Sheets

HIGHLY MICROPOROUS 2:1 LAYERED SILICATE MATERIALS

BACKGROUND OF THE INVENTION

Field of the Invention

The 2:1 layered silicates, mica, and vermiculite are processed into a variety of forms and are used in many different products. Their fire resistance especially makes them desirable for use in many products. They have, for example, been used in fire resistant boards, papers, and coatings.

These 2:1 layered silicates (mica and vermiculite) have, of course, been used in their natural state (for example as fillers). Many different types of compositions can be obtained from these silicates. They have been chemically delaminated to separate the platelets (lamellae) and produce mineral compositions that can form aqueous suspensions or dispersions.

The chemically delaminated micas and vermiculites have been subjected to ion exchange to get silicate flocs. Vermiculite has been heat exfoliated to convert the water of hydration into steam, expand the vermiculite, and produce exfoliated vermiculite. Although the exfoliated vermiculite is good as an insulation, the pore structure is open and very irregular, with many layers remaining tightly knitted together and others widely separated by distances of 1,000 microns and more.

The present invention provides and describes a new and different compositional form of 2:1 layered silicates. The 2:1 layered silicate compositions described herein are low in density, highly microporous with a regular pore structure, and have thermal conductivity properties that are both unusual and desirable. Advantageously, instant compositions can be made into a variety of structures that can provide thermal insulation and a level of heat protection which, heretofore, has not been possible with the 2:1 layered silicates.

Different methods for the preparation of these silicate compositions are also described herein.

SUMMARY OF THE INVENTION

The instant microporous silicate compositions comprise a structure of lamellae of a 2:1 layered, chemically delaminated silicate, the said silicate being selected from the group consisting of mica and vermiculite. The lamellar structure of individual mica and vermiculite is close to (and even visually suggestive of) the arrangement of lamellae as they were in a silicate dispersion before the suspending liquid was removed in drying.

Normally with prior art preparation procedures for chemically delaminated layered silicates, the lamellae will rearrange and collapse (generally during drying), producing a rearranged, dried product having high densities and low porosity. Methods used to prepare the present dry, highly microporous, low density 2:1 layered products, however, are designed to remove the suspension and/or flocculation solvent without the collapse of the lamellae. Thus the arrangement of the lamellae in these silicate structures is taken (or derived) from the arrangement of the lamellae as they were at one time in an aqueous dispersion.

The present highly microporous, low density silicate structures have a porosity greater than about 60% of its volume in pore space (pore volume), and very low densities. The pore structure, as can be noted in FIGS. 1-3, could be described as cellular with a structure of both open cells and closed cells.

These highly microporous compositions have excellent and unique thermal insulating properties. Since the silicate structure is substantially similar to the structure of the lamellae in the flocculated dispersion before drying, the structure can be specifically planned using process steps that affect and control the placement and/or orientation of the lamellae in the dispersion.

Particular structures can be made which have thermodynamic advantages. More specifically, the pore structure can be made to insulate more along one plane than it does along another. This provides an insulative material that has the capacity to conduct heat out of the material along one plane, while at the same time it insulates in the other directions.

The highly microporous silicate structures which are more thermally conductive along one direction than the others characteristically have pores grouped together that are longer in the thermally conductive direction. Such pores, for example, can be described as egg-shaped, oblong, and/or rectangular. Heat is conducted faster in the direction and orientation of the longer pores. Such compositions are thus called anisotropic.

To prepare the instant compositions, chemically delaminated mica and vermiculite are used for the dispersions. In chemical delamination, cations are put into the mica and/or vermiculite by ion exchange. The cations are water swelling, allowing the mica or vermiculite to form an aqueous suspension (also referred to as "dispersions"). In the water swelling form, the interlayer cations are easily hydratable (like lithium or sodium), which permit the layered silicate to swell and disperse in aqueous liquids thereby forming the dispersions. In flocculation, interlayer cations are introduced that cause the lamellae of a dispersion to draw together forming a floc. Normally a flocculated dispersion will be used to prepare the instant compositions, although by using lyophilization, a non-flocculated dispersion could be used.

In referring to the present compositions and structures, terms used herein are "expanded" and "uncollapsed" to refer to the present low density, high porosity silicate materials. When compared to sheets of other flocculated, chemically delaminated mica and vermiculite (like the films made by the methods of U.S. Pat. No. 4,707,298) the instant compositions are from about 4 to 12 fold thicker.

The terms "silicate" or "2:1 layered silicate" as used herein refers to mica, vermiculite and mixtures thereof.

Both natural silicates and synthetic layered silicates (such as fluorhectorite) can be used. The term vermiculite as used herein includes minerals consisting wholly or largely of vermiculite, or materials of a mixed layer type such as hydrobiotites, biotites, and chlorite vermiculites.

Several methods can be used to prepare the instant, highly microporous compositions. The compositions can be prepared by a) lyophilization of an aqueous dispersion of unflocculated or flocculated silicate; b) contacting a flocculated silicate dispersion with a "displacing solvent" to mix with and remove the aqueous flocculating solvent without collapsing the lamellar silicate structure, and then removing the displacing solvent from the silicate to form the composition.

DESCRIPTION OF PHOTOGRAPHS

FIGS. 1 and 3 (having a magnification of 1,000) and FIG. 2 (having a magnification of 3,000) all have lines which indicate what the distance of 10 microns is in the structures of the photographs. Since the space inside the structures is discussed herein largely in terms of porosity, the particular internal structures (many of which are notable in the photographs) are referred to as "pores". Many of the lamellae, forming these pores, can be seen in the photographs.

FIGS. 1 and 2 show samples of example 1 (made by solvent displacement of a drawn film).

FIG. 3 was prepared using the comminution, cast-molding method. This structure was prepared, by casting into a mold, the comminuted, particulate, highly microporous vermiculite (made by solvent displacement followed by comminution--using the procedure of example 19). Notably, FIG. 3 shows a highly microporous structure with more circular pores.

In contrast to FIG. 3, FIG. 1 shows pores that are more oblong or rectangular, having at least one dimension that is shorter in length than the other two, producing an anisotropic structure. FIG. 3, however, shows pores having more similar distances in all three dimensions within the pore. In such silicate microporous structures, therefore, a more spherical internal pore is obtained which is isotropic.

DETAILED DESCRIPTION

The present compositions, structures, and articles are a unique type of silicate materials. Even compared with other silicates such as exfoliated vermiculite, the present materials have advantageous characteristics that even these silicates cannot match. Such characteristics include low thermal conductivity values that are characteristic of good insulating material. Quite uniquely, the thermal conductivity is virtually unaffected by temperature even up to at least about 1025° F. and even higher. In fact, unlike virtually all other materials, the thermal conductivity of the invention materials is very constant over a very broad temperature range (from ambient to at least about 1000° F.).

Another characteristic that is unique to the present materials, and very advantageous for articles and structures used in thermal insulation, is the ultra fine pore structure.

Other advantageous characteristics that make the instant compositions ideal as thermal insulation includes low densities and very high pore volumes. The porosity can range from about 60 to about 95% pore volume. The instant low density, highly microporous silicates can conveniently be described and classified into a) the most microporous, b) intermediate microporous, and c) least microporous. The lowest density, most microporous materials are those having porosity levels in excess of about 88% pore volume. Such materials could be called "fully expanded" or completely uncollapsed and have porosity levels from about 88 to about 95%. The intermediate microporous structures having densities that are slightly higher and having only slightly less pore volumes are the structures that are at least partially uncollapsed. These partially expanded silicate structures still have a porosity greater than about 75% pore volume. The structures have an intermediate range of porosity from about 75 to about 88% pore volume. The least microporous of the instant microporous, structured silicate compositions still have a porosity greater than about 60% pore volume. In comparison, the completely collapsed, unexpanded films of chemically delaminated mica and vermiculite compositions of such prior art references as U.S. Pat. Nos. 4,707,298 and 4,800,041 have densities of about 80 to about 120 lb./ft.$^3$ and pore volumes of 40% at the most and generally in the order of 30% or less.

In addition to this, the present materials can be made in virtually any shape or size (using processing techniques like molding). Their light weight allows larger structures to be made, thus permitting new and different applications, articles and uses for chemically delaminated mica and vermiculite compositions. Large, continuous thermally insulative matrixes consisting essentially of the silicate are not possible with other prior art compositions like exfoliated vermiculite (unless a binder is used).

Although the pores are not absolutely uniform in size and shape, the product structure is notably uniform on an overall basis, unless processing techniques are used to introduce specific, internal structural differences. In the structure, a typical pore shape (such as rectangular, egg-shaped, or spherical) can be found repeated throughout the structure. In most cases, moreover, most of the pores tend to be oriented in a similar manner or direction.

The present structured silicate compositions are truly microporous. Measurements taken by mercury intrusion porosimetry and visual observation using the electron microscope indicate that at least about 70% of the pore volume is in pores having a diameter less than about 100 microns, at least about 60% is in pores having a diameter less than 25 microns, and at least about 40% of the pore volume is in pores having a diameter less than about 2 microns. Pore measurements of preferred, most highly microporous embodiments (greater than about 88% pore volume) indicate that the instant, completely uncollapsed silicate structures have at least about 75% of the pore volume in pores that are less than about 25 microns across a diameter. The "diameter" here is intended as the measurement from one wall to another (although the mercury intrusion porosimetry data presumes that the pores have an idealized spherical pore geometry). Preferred materials with at least about 65% of the pore volume in pores that measure less than about 12 microns in one direction can be obtained.

The high porosity of the present compositions and the small pore sizes are features that uniquely set the present compositions off from all other mica and vermiculite compositions. Even prills and foamed silicate compositions cannot match the high percentage of very small pore sizes found in the present compositions.

Structures made with drawn films have the tendency to conduct heat in one direction (due to elongated pores). Pores longer in one direction than in the others (oblong) will pass heat faster in the direction that the pore is longest in. For an article to have anisotropic behavior, the silicate used should be a drawn structure which will have an effective number of oblong pores.

Notable anisotropic performance can be obtained from structures having a substantial number of pores at least about 1.25 times longer in the direction conducting heat. Highly anisotropic structures, can be drawn rapidly from dispersions having a percent solids in the range of from about 6 to about 12%.

Although the anisotropic behavior will be obtained with even as little as about 10% of the pores having an oblong shape, for better results it is more preferred that a more substantial percentage of the pores (at least about 25%) be longer in one direction. Other more preferred anisotropic structures will have greater than about 50% of its pores being oblong.

Compositions having pores that are longer in one direction than in another will make the material more thermally conductive along the direction that the longer pores lay (anisotropic). This allows heat to be directed one way while insulating the material in the other directions where the pore length is shorter.

Preferred structures having anisotropic characteristics have a minimum of about 35% of its pore volume in pores that are less than about 15 microns in the thermally conductive direction, and in the other thermally insulative directions the pores will be shorter, less than about 7 microns. Even more preferred structures will have at least about 40% of the pores with an elongated pore length of from about 0.1 to about 10 microns in the heat conductive direction (longer than the pore is in the direction that is not conductive), and less than about 5 microns in the other directions where they are shorter (and thus more insulative).

In the thermally insulative direction (along the shorter pore length) thermal conductivity can be maintained at lower than about 0.45 BTU.In/hr-Ft$^{2°}$ F. at temperatures from ambient up to 1025° F. Preferred structures have given thermal conductivity measurements in the insulative direction of about 0.3 BTU.In/hr-Ft.$^{2°}$ F. at ambient temperatures to about 0.4 BTU.In/hr-Ft$^{2°}$ F. at temperatures of about 1025° F. In the thermally conductive direction (having the longer pore length) thermal conductivity acceptably is at least about 0.75, and preferably is at least about 1 BTU.In/hr-Ft.$^{2°}$ F. at temperatures ranging from ambient to 1025° F.

The ability to distinguish individual lamella in the structure (using the electron microscope) is a characteristic common to the present silicate materials. When viewed under the electron microscope, it can be noted that the microporous silicate structure is made of lamella and is flaky in appearance. Individual flakes can be seen in the structure. Individual platelets (lamella) tend to be separated and form walls of the pores. Thus, the structure can be called "lamellar", which is another distinguishing feature of the instant silicates. Pores can be noted that have a single thickness of a lamella forming a wall. Since, moreover, the pore walls are formed by lamellae, it should be readily appreciated how small the pores of the structure are (because the lamellae themselves are so small). A typical measurement of a flake (lamella) being from about 500 to 100,000 Angstroms in length and width diameters, and less than about 100 Angstroms thick.

The degree of flakiness and the cell structure of a particular silicate, can be affected by the particular silicate preparation used.

Particular pore structures can in fact be produced using certain preparation methods. Process steps like drawing, compressing, shearing, or extruding can be used to get structures with pores having particular characteristic shapes.

The agitation-cast molding methods can be used to prepare materials (such as the structure shown in FIG. 3) having more spherical pores providing a pore pattern that is substantially the same in all directions, being due to the fact that the pores are substantially spherical instead of the rectangular type of pore of the anisotropic structures. Pore measurements indicate that structured silicates having at least about 45% of its pore volume in pores that have diameters less than about 12 microns can be obtained with methods such as the agitation-cast method of example 19.

The highly microporous silicates which have substantially spherical pores (made, for example, by comminution and casting or molding) do not tend to conduct heat in any one direction more than others. Structures can be obtained that have a thermal conductivity ranging from about 0.45 BTU.In/hr-Ft$^{2°}$ F. at ambient temperatures to about 0.6 BTU.In/hr-Ft$^{2°}$ F. at temperatures of about 1005° F.

The present microporous structures are distinguishable from other similar compositions, such as dried dispersions of flocculated and unflocculated mica and vermiculite, by having a density that is much lower and by their high porosity. These highly microporous materials have a unique "puffed" appearance and can be crushed or compressed easily. Internally, the electron microscope shows that the compositions have pore structures that might be described as cellular (although they are not uniform in shape). It could even be called honeycombed, although the pores do individually differ between themselves. The compositions do, however, have a pore pattern which is found throughout the structure. In this pattern similar pores are seen repeatedly. Aqueous suspensions contain mica and vermiculite platelets arranged in a loose relationship. While not wanting to be bound by theory, it is believed that the arrangement of the silicate lamellae in these dispersions are largely responsible for the structure of the present compositions. One type of lamellar structure of the silicate platelets in the flocculated dispersion has been referred to as a "house of cards structure" in which the platelets align themselves so that the edge of one is away from the edge of the other, and has its edge pointed more toward the central areas of another platelet (note pg. 186–187 of *Basic Principles of Colloid Science*, by D. H. Everett; Royal Society of Chemistry Paperbacks, 1988).

The processes described herein for the preparation of these compositions are intended and designed to remove the suspending liquid from the flocculated dispersion (or unflocculated dispersion using lyophilization) without the collapse or rearrangement of the lamellae as they are in the dispersion. Thus it is felt that the arrangement of the lamellae in the instant structures is substantially the arrangement of the lamellae in the dispersion. The techniques that are successful for the preparation of the present structured silicate compositions preclude the liquid to vapor transition of the water present within and surrounding the suspended, chemically delaminated silicate network.

With the structures made from the flocculated dispersions, the product will be stronger, more stable, and also more water resistant. Although a lyophilized non-flocculated highly microporous silicate structure can be calcined for better water resistance and stability, this calcined product will be more brittle than the highly microporous flocced silicate structure.

With regard to these processes, furthermore, both the solvent displacement method and the lyophilization method involve the removal of the aqueous medium from the dispersion without having the liquid to vapor phase change during which the dispersion's lamellar (lamellae's) microstructure collapses.

The solids level of the suspension used in preparation of the instant compositions does seem to effect pore volume and therefore the density of the resulting product. This also allows some control over the microporous structure itself. For example, various process steps can be used to obtain microporous silicate products with particular characteristics such as desired pore structures (like those which are anisotropic) and particular density levels.

Dispersions having any percent solids level can be used in the preparation of the present highly microporous mica and vermiculite compositions. Dispersions having higher percent solids will allow the present compositions to have higher densities than those made with the less concentrated dispersions. Dispersions of about 1% or even lower can be used to prepare the present compositions. Some lamellar rearrangement can be expected during flocculation, and even more rearrangement with very low solids (less than about 7% solids). Higher solids dispersions are sometimes called gels. The dispersion becoming gel-like at about 7% solids.

Conventional methods can be used to prepare the dispersions. Normally the maximum solids will be about 20%. It has been found that by using dispersions having a percent solids of from about 17 to about 20% will produce microporous products with densities and pore volumes in an intermediate range. Densities of about 23 lb/Ft$^3$ and a pore volume of about 85% have been obtained using 18% solids dispersions. Higher pore volumes and lower densities are more easily obtained with the dispersions that are less than about 16% solids. The most highly microporous compositions, with greater than about 75% of the pore volume in pores with a diameter less than 25 microns, can be made from dispersions having a solids level in the range of from about 7 to about 16%.

If using the solvent displacement method to prepare the instant compositions, a flocculated dispersion must be used. In this instance, the highly microporous composition will derive its structure from the structure of the flocculated silicate.

The displacing solvent is any solvent (including mixtures) which can displace the polar flocculation solvent in the flocculated dispersion so that, instead, the displacing solvent fills the flocced silicate structure. Then the displacing solvent can be removed without causing or permitting the collapse of the flocced structure. In this method, the displacing solvent is selected in combination with the flocculating exchange cation.

The "displacing solvent" can be defined as any solvent or mixture of solvents that has at least some miscibility with the dispersion's liquid medium so that the aqueous liquid medium of the dispersion is extracted and replaced with the solvent when the dispersion is contacted with the solvent. Preferably, the displacing solvent has a boiling point less than about 125° C. It is also desirable that the surface tension of the solvent be low. Preferably, the surface tension is less than about 30 dynes per cm (centimeter). Solvents that meet these requirements include acetone, methyl ethyl ketone, methyl isobutyl ketone, methanol, ethanol, ispropanol, and butanol.

With the solvent displacement process, the combination of flocculant and displacing solvent is important. Where combinations of cations are used, then the displacing solvent can be a single solvent compatible and functional either with all of the cations or at least with a substantial portion (greater than about 40%) of the flocculating cationic species.

Displacement solvents can be selected from the group consisting of alcohol, methylethyl ketone, methyl isobutyl ketone, and acetone. The preferred solvents to use in the solvent displacement method are alcohols. Alcohols having up to 5 carbon atoms are effective with both the cationic metal flocculants such as potassium, calcium, and magnesium, and also where diamine flocculants that have 7 or less carbon atoms in a linear or branched saturated or unsaturated hydrocarbon moiety are found. Other preferred solvent-flocculant combinations are methylethyl ketone, methyl isobutyl ketone, and acetone when the flocculant cation is potassium or the C7 (or less) diamine. Of these, the preferred solvents are methylethyl ketone and acetone.

Preferred alcohols for liquid displacement can be selected from the group consisting of methanol, ethanol, propanol, isopropanol, and butanol. Of these, the most preferred are ethanol and isopropanol. Higher alcohols (such as hexanol) can be used with diamine flocculants.

In the solvent displacement method, a flocculated dispersion of the 2:1 layered silicate is contacted with the displacing solvent to replace the aqueous flocculation solution from the dispersion. The displacing solvent extracts the aqueous flocculation liquid. The floc is dried after an effective amount of the water has been replaced with the displacing solvent in order to allow drying without the loss of the house of cards structure. The aqueous medium is removed by contacting the flocced dispersion with enough of the displacing solvent for an effective length of time or by using more than one portion of the displacing solvent. Thereafter, it is dried to form the instant highly microporous materials.

Suitable methods of contacting the flocculated silicate include immersion in the solvent liquid and contacting the silicate with a vapor phase of the replacing solvent. The vapor phase extraction of the aqueous flocculation liquid is even more efficient than the immersion method. The refluxing vapors of the displacing solvent quickly help to remove the aqueous flocculation liquid from the silicate floc that is located in the vapor zone. Residual solvent can then be evaporated (for example, by using heat to flash off the remaining solvent).

Visual inspection indicates that the vapor phase solvent extraction method results in a more card house-like structure. One explanation for this is that the vapor phase solvent displacement process may be so rapid and efficient that there is even less rearrangement of the edge to face floc (house of cards) structure. Thus, advantages of the vapor phase solvent displacement procedure includes the minimized rearrangement of the dispersion's silicate structure and its speed and efficiency.

When using the liquid phase extraction method, the displacing solvent is given a sufficient amount of time to diffuse into the silicate and displace the liquid medium of flocculation. This does require more time than the vapor phase extractions. Thus, for speed, and especially when thicker microporous silicate structures are being prepared, the vapor phase displacement method is preferred. When a floc or microporous product is needed at a thickness greater than about 20 mils thick the vapor phase solvent displacement method is preferred.

The present compositions can also be made by lyophilization (sublimation drying). With lyophilization, however, substantial rearrangement can occur during drying if a low solids, non-flocculated suspension is used. In this case, rearrangement will occur due to the lack of a stable house of cards structure in the suspension being lyophilized. Thus, to avoid this type of rearrangement, either a flocculated dispersion can be lyophilized or the suspension used should be high enough in percent solids to effectively form a stable structure of lamellae (with minimum rearrangement during drying). Flocculation does stabilize the suspension so that the lamellae form a sufficiently stable structure within it to allow removal of the polar solvent without a large degree of rearrangement.

If lyophilization is used to prepare the instant highly microporous silicate structures, the starting material can be either a flocculated or unflocculated dispersion. If, furthermore, a flocculated dispersion is used, the cationic flocculant which was used to prepare the flocculated dispersion could have been from any flocculant at all, including mixtures thereof.

Water resistance is obtained only by using the flocculated, ion exchanged mica and vermiculite. In lyophilizing a non-flocculated suspension, the present microporous silicates can be prepared, but these materials are not as water resistant or as stable over time as the microporous structures that are made using the flocculated suspensions. Although, if desired, the non-flocced highly microporous structure can be calcined to remove water from the layers, making the structure more water resistant. Disadvantageously, however, the materials are more brittle after calcination, and flocculation is more preferred. One of the most outstanding features of the instant compositions is that they have both high porosity and small pore sizes. Furthermore, these silicates also advantageously tend to have an extremely uniform internal structure compared to other insulative silicate materials like exfoliated vermiculite.

In addition to this, the present structures can also advantageously be prepared in any size and shape by filling a suitable mold with the unflocculated or flocculated dispersion before lyophilization or solvent displacement. Heat insulation can thus be molded or extruded into a shaped piece having a desired configuration (such as for fitting around pipes or to suit any other insulative need).

The process steps of comminution followed by casting into a suitable container or mold can also be used to prepare highly microporous, structured silicate compositions. The structures made using comminution and casting in a mold are distinctive. The structure is very uniform and has small, rather round micropores.

Comminution and casting will produce a silicate structure that has a uniform heat flow in all directions.

Comminution and casting can be done conveniently at more than one point during the preparation of the present microporous silicates. For example, it is possible to comminute and cast either the aqueous floc before displacing or lyophilizing or it can be done to the solvent displaced floc before drying. This comminuted floc is put into a mold and then either dried, or solvent displaced and dried to form the instant compositions. Preferably, either lyophilization or vapor phase displacement is used on comminuted, molded flocs.

Although the present compositions can be prepared from dispersions that are even down to 1% solids, the silicate suspensions used will usually be preferred to have a percent solids level of at least about 5%. Dispersions of higher percent solids will tend to hold a shape most easily, although dispersions in excess of 25% solids are difficult to handle in some process steps such as drawing into films. Any dispersion that can be made with chemically delaminated vermiculite or natural or synthetic mica, however, can be used to make one of the instant highly microporous structured silicates. For either the lyophilization method or the solvent displacement process, an acceptable solids level for the dispersion is in the range of from about 5 to about 20%, and a preferred solids level is in the range of from about 7 to about 18%. The dispersions in the preferred range are advantageously easier to draw into film and other article shapes and also have fairly good handling properties.

Where thermal insulation is desired, insulative highly microporous compositions and insulative articles made from these silicate compositions can be prepared. Preferred compositions can even be prepared which have a thermal conductivity less than the conductivity of still air at specified temperatures. The instant highly microporous silicate compositions have been prepared which had a thermal conductivity less than the conductivity value of still air at about 800° F. and up. This has been seen at temperatures up to even 1025° F.

The compositions of the instant invention (having a total pore volume greater than about 60%) include highly microporous thermally insulative silicate structures which have at least about 10% of the pore volume in pores having a diameter in at least one direction (the thermally insulative direction) which are about the same distance as the mean free path of air at temperatures greater than about 375° F. This means that in microns at least about 10% of the volume is in pores that have a wall to wall measurement in one dimension of from about 0.05 to about/0.3 microns. Mean free path of air is the average distance traveled by an atom or molecule of gas between collisions. The more preferred thermally insulative, highly microporous, structured silicate compositions have a higher percentage of pores that measure less than about 0.3 microns from wall to wall in at least one direction. Measurements have indicated that more preferred insulative sheets have been produced in which at least about 25% of the pore volume is in pores that measure less than about 0.3 microns in a wall to wall pore measurement.

Advantageously, the present compositions can also provide such thermally insulative, structured silicates with elongated pores. These will have some pores (acceptably, at least about 10% of the pore volume) that measure less than 0.3 microns in the short, thermally insulative direction, but will have much longer pore lengths in the thermally conductive direction. Preferably, the pores will be a minimum of about 0.75 microns in the longer, more thermally conductive direction. Acceptably, a minimum of about 10% of the pore space (volume) is in pores of this size, and preferably these pores take up a minimum of about 25% of the pore volume. Sheets of this type of insulative composition have been produced where pore volumes were greater than 88% of the total sheet volume. Measurements indicate that many samples had an unusually high percentage (from about 10 to about 45%) of the pore space in these smaller pores.

These silicates, having highly microporous, elongated pores, are made by laying or drawing an aqueous silicate dispersion into a film or other shape, using a blade or a suitable aperture. The dispersion can then either be lyophilized and preferably calcined, or it can be flocculated after which the aqueous flocculating liquid is lyophilized or solvent displaced followed by drying.

Preparation of the microporous lamellar structures can done continuously. The wet flocculated lamellae can be continuously moved or placed into contact with the displacement solvent, either by immersion or by using the displacement solvent as a vapor. Alternatively, a continuous lyophilization process could also be used. Various procedural steps like comminution of the flocculated dispersion could also be done in such continuous processes.

These highly microporous, structured silicate compositions can be advantageously made into a variety of product types. Such products include insulation that could be pour-in-place particles or in the form of larger sheets, blocks or even molded shapes. Other product types are coatings, pipe coverings, molded or curved facings which could have an embossed, printed or painted decorative surface, insulative fittings or pieces, and gasket structures.

Coatings of the present compositions can be put onto surfaces by coating the surface with the dispersion, and then preparing the microporous structure from the dispersion using any of the previously discussed procedures. Multiple layers of the materials can be made by using adhesives to bind sheets together, or by wet-plying the layers or coatings together.

If desired, however, the surfaces of objects can be fitted with coverings of the instant materials that have been cut and/or molded for the surface. These coverings can also be fixed in place if desired using an adhesive material, or by using other means for attaching the covering such as by using screws, bolts, clamps, etc.

Flame barriers and/or thermally insulative pieces or fittings can be molded or cut for a machine or article of manufacture. Advantageously, the highly microporous silicate structure can intentionally be given the tendency to conduct heat along a desired path.

Other useful highly microporous compositions include segmented or comminuted particulate materials. These can be prepared by mechanical size reduction of the microporous silicate structure either before or after the final drying step. Preferably a flocced silicate is used. The particulate materials could be used as pour in place insulation. It could also be combined with binders, adhesives, or resins to prepare compositions for molding or coating. By using resins, binders, adhesives, and the like, the present materials can be given more flexibility, shock resistance, and elastic-recovery.

Comminution of the instant compositions can produce a variety of different particle sizes. Particles can be obtained that have an average particle size less than 200 microns, and even less than 125 microns. It is even possible to obtain powder-like microporous compositions having average particle sizes less than about 60 microns. In these the smallest micropores remain preserved between platelets that stay together forming the particle. A preferred particle size range for the powder-like materials is from about 20 to about 80 microns. In these compositions, the pore size of each particle will, of course, be small, but the porosity is still high and the density low.

If a powder-like, pourable, microporous silicate composition is desired, it is preferred that a silicate floc is used because of the better strength obtained in the silicate particle's structure.

Additional materials and additives can be used with the present highly microporous structured silicate compositions. Such substances can be mixed with the silicate at any convenient point of its preparation process. Additives and modifiers such as pigments, dyes, fillers, resins and latexes are easily combined with the dispersion. Such materials suitably will be used in an amount up to about 35% by weight of the dry composition.

Product alternatives include the use of electrically conductive modifiers or fillers in order to prepare antistatic or static dissipative layers or paths in the silicate article or composition structure.

The examples that follow illustrate the present invention, and should not be taken to limit it. All parts and percentages are by weight unless otherwise indicated.

Solvent Immersion Procedure

Examples 1-14 show the use of a solvent immersion procedure to prepare sheets of the microporous silicate. The starting silicate material was W. R. Grace lithium vermiculite dispersion (Microlite TM GP923)

Using a Bird blade, the dispersion was drawn into a film which was then immersed in an aqueous flocculation solution. After flocculation the films were washed in heated deionized water. After washing, the films were placed in the selected immersion (water-displacing) solvent. After a period of time, usually overnight, the film was removed and the solvent was permitted to evaporate from it.

The physical condition of the film was noted after removing it from the immersion solvent and drying it.

When a suitable flocculant-immersion solvent combination was used, an "expanded" film of the microporous silicate was produced. The films were, at first, stiff and rigid.

After the immersion solvents evaporated, however, the films produced were more flexible. They also were opaque and tan colored in appearance. Physically, these "expanded" films were flexible and soft. They were compressible to the touch (similar to Styrofoam TM), and they had a "puffed" appearance compared to the films that were dried without treatment, or that were treated with an ineffective flocculant-immersion solvent combination.

EXAMPLE 1

The W. R. Grace vermiculite dispersion was concentrated to 12% solids and the film was drawn using a Bird blade with a 20 mil opening. Two 6 x 12 inch (in.) 10 mil thick wet films were cast. The films were flocculated in 0.25N 1,4 butanediammonium chloride (BDA).

One film was the control, and the other was sample A. The control was air dried to produce a dried film of the type described in U.S. Pat. No. 4,877,484.

Sample A was placed in acetone overnight and in fresh acetone the next day. It was then taken out, and after the acetone had evaporated, the flexible, soft, expanded film was obtained. The air dried control sample was flat and thin, had a deeper brown color, a semitransparent appearance, and felt more like a plastic film.

Figure 1:
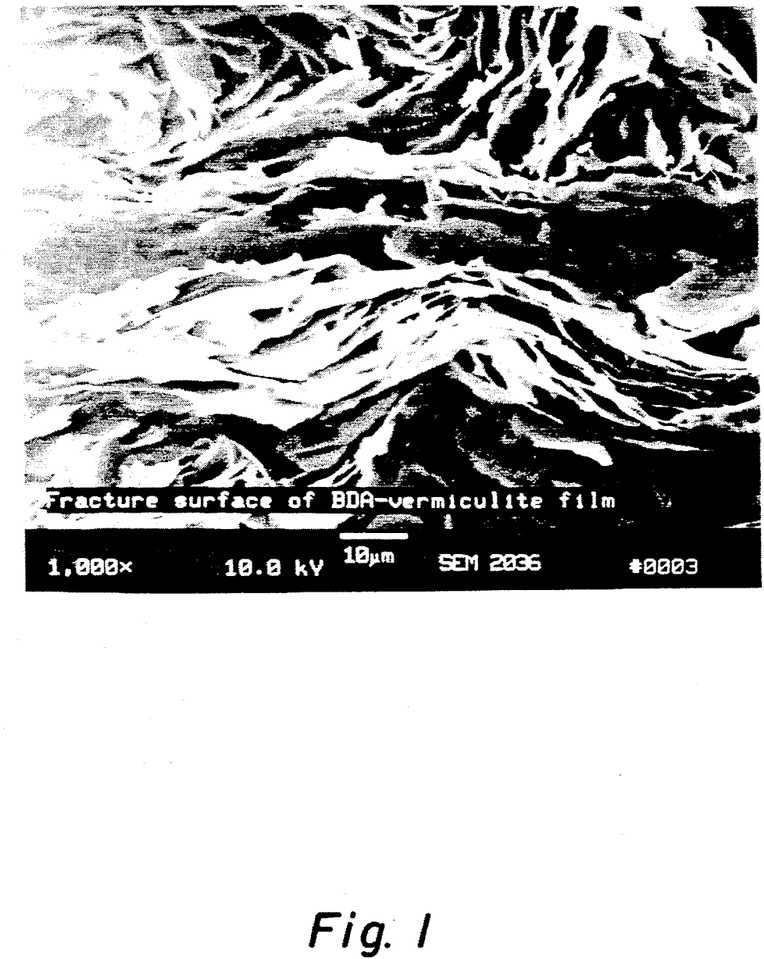
FIGS. 1-3 are photographs of fractured cross-sections of highly microporous vermiculite structures, which were taken using the scanning electron microscope.
Figure 2:
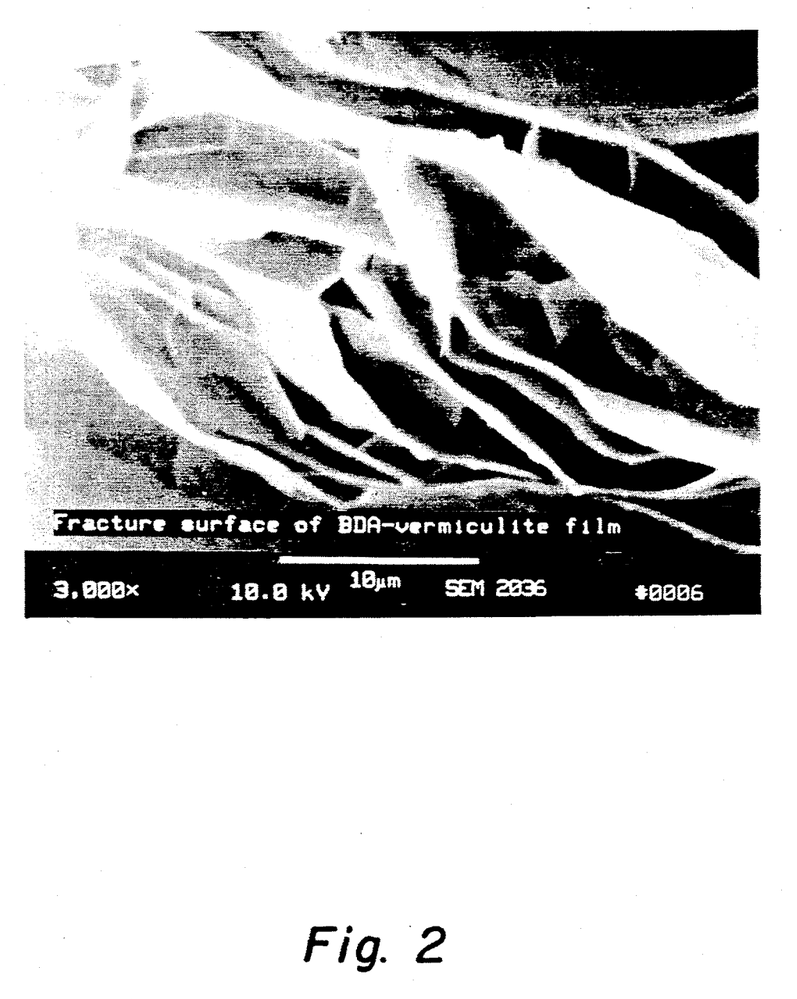
Figure 3:
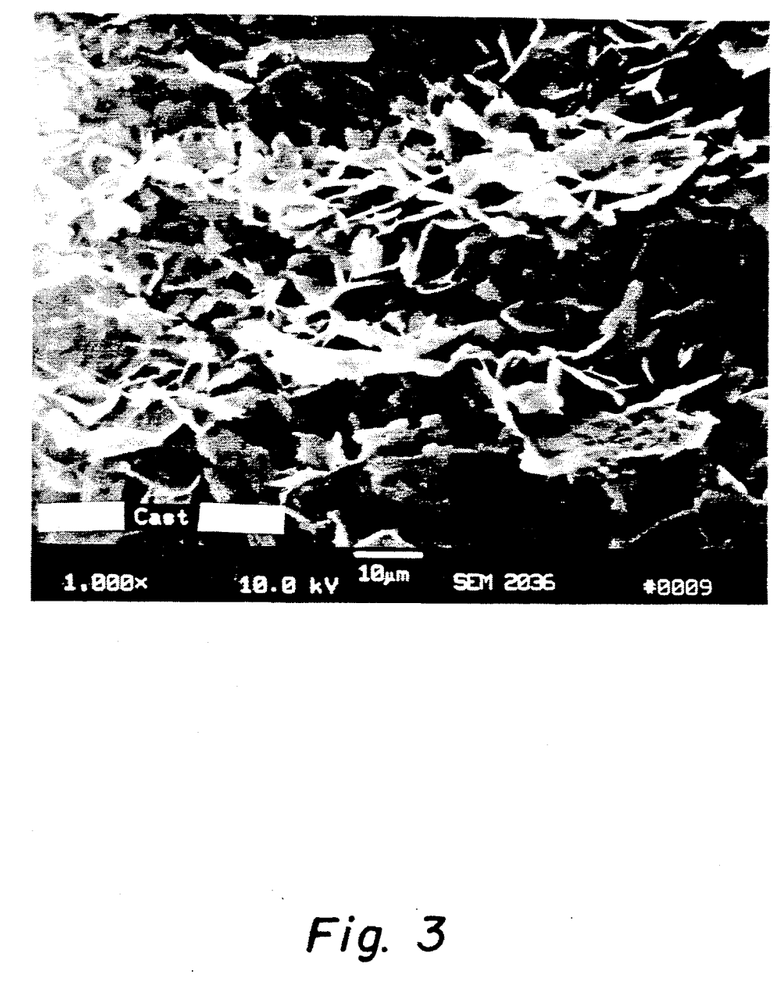

SEM cross-sections of sample A is shown in FIGS. 1 and 2. Other data are shown in Table 1.

TABLE 1

| Properties of Control and Acetone Steeped BDA/Vermiculite Films | | |
|---|---|---|
| Property | Control | Acetone Steeped |
| Wt. (g.) | 0.81 (5" × 5½") | 0.83 (5" × 5") |
| Thickness - mils | 1.0 | 10.2 |

TABLE 1-continued

Properties of Control and Acetone Steeped
BDA/Vermiculite Films

| Property | Control | Acetone Steeped |
|---|---|---|
| Density - lbs./ft$^3$ | 112.22 | 12.12 |
| Tensile Strength - Psi | 7355 | 433 |
| Pore Volume - % | 29.5 | 90.5 |
| Median Pore Diam. (microns) | 0.106 | 2.46 |

EXAMPLE 2

The 0.25N BDA flocculant solution used in example 1 was used to flocculate nine other films which were then immersed in different solvents. The solvents used and the results obtained are indicated below.

A) A fully expanded (completely uncollapsed) microporous silicate sheet was obtained from the following solvents: methanol, ethanol, MEK (methyl ethyl ketone), IPA (isopropanol alcohol), and butanol.

B) With MIBK (methyl isobutyl ketone) as the immersion solvent, the sheet produced was a partially expanded, microporous structure. The film had a rougher surface and was darker in color than any fully expanded sheet produced under A.

C) Using pentane, methylene chloride, and chloroform with the butane diammonium vermiculite was not effective to produce a microporous silicate.

EXAMPLE 3

Using the previously described procedure, the 10 solvents tested under Example 2 were tried with films where 0.5 normal (N) 1,6 hexane diammonium chloride had been used as the flocculant. The results obtained are given below.

A) A fully expanded, microporous silicate structure was obtained with the following solvents: MIBK, IPA, MEK, butanol, ethanol, methanol, and acetone.

B) Partially expanded, microporous silicate structures were obtained with pentane and with chloroform.

C) Methylene chloride was not effective, and a flat, unexpanded silicate sheet like the control of example 1 was obtained.

EXAMPLE 4

A flocculating solution that was 0.25N heptane diammonium chloride was used to prepare 3 films which were then treated according to the described immersion procedure. The results are given below.

A) A fully expanded, microporous silicate structure was obtained with IPA as the solvent.

B) A partially expanded, microporous silicate structure was obtained with acetone as the solvent.

C) Methylene chloride was not effective, and a flat, unexpanded silicate sheet like the control of example 1 was obtained.

EXAMPLE 5

A flocculating solution that was 0.25N octane diammonium chloride was used to prepare 3 films which were then treated according to the described immersion procedure. The results are given below.

A) Partially expanded, microporous silicate structures were obtained with acetone and when IPA was used as the solvent.

B) Methylene chloride was not effective, and a flat, unexpanded silicate sheet like the control of example 1 was obtained.

EXAMPLE 6

A flocculating solution that was 0.25N decane diammonium chloride was used to prepare 3 films which were then treated according to the described immersion procedure. The results are given below.

For all three samples, the solvent-flocculant did not form an effective combination to produce a microporous structure. A flat, unexpanded silicate sheet like the control of example 1 was obtained.

The solvents used were: methylene chloride, acetone, and IPA.

EXAMPLE 7

A flocculating solution that was 0.25N 2-methylpentamethylene diammonium chloride was used to prepare 3 films which were then treated according to the described immersion procedure. The results are given below.

A) A fully expanded, microporous silicate structure was obtained with IPA as the solvent.

B) A partially expanded, microporous silicate structure was obtained with acetone as the solvent.

C) Methylene chloride was not effective, and a flat, unexpanded silicate sheet like the control of example 1 was obtained.

EXAMPLE 8

Using the previously described procedure, the 10 solvents tested under Example 2 were tried with films where a 0.2N melaminium chloride solution had been used as the flocculant. The results obtained are given below.

A) A fully expanded, microporous silicate structure was obtained with the following solvents: IPA, MEK, butanol, methanol, and acetone.

B) A partially expanded, microporous silicate structure was obtained with both ethanol and with MIBK.

C) With the solvents methylene chloride, pentane, and chloroform, flat unexpanded silicate sheets like the control of Example 1 were obtained. These solvents were not effective to produce a microporous silicate structure.

EXAMPLE 9

Using the previously described procedure, the 10 solvents tested under Example 2 were tried with films where a 0.5N potassium chloride solution had been used as the flocculant. The results obtained are given below.

1) Fully expanded, microporous silicate structures were obtained with the following solvents: IPA, MEK, butanol (labeled sample 9C), methanol, and ethanol.

2) A partially expanded, microporous silicate structure (sample 9B) was obtained using acetone.

3) With the solvents MIBK, methylene chloride, pentane, and chloroform, a flat and unexpanded silicate sheet like the control of Example 1 was obtained. These solvents were not effective to produce a microporous silicate structure.

Pore Volume and Density

For a comparison, another sample (9A) was made using the potassium flocculant, but no solvent was used to displace the aqueous flocculation liquid. The pore volume and density of this sample, the partially expanded sample 9B, and the fully expanded sample 9C were taken, and the results are given below:

TABLE 2

| Sample | Density (lb./ft$^3$) | % Pore Volume |
|---|---|---|
| 9A (totally collapsed) | 101.1 | 40.0 |
| 9B (partially open) | 40.3 | 76.1 |
| 9C (completely open) | 16.0 | 90.5 |

The above data indicates the high pore volume and low density of the present compositions. The most microporous silicates will have a density lower than about 25 lb/ft$^3$, in the least porous materials the densities will normally be lower than about 55 lb/ft$^3$.

EXAMPLE 10

Using the previously described procedure, the 10 solvents tested under Example 2 were tried with films where a 0.5N guanidinium chloride solution had been used as the flocculant. The results obtained are given below.

1) A completely open (fully expanded), microporous silicate structure was obtained with the following solvents: IPA, MEK, butanol, methanol, acetone (sample 10FD), and ethanol.

2) A partially expanded, microporous silicate structure was obtained using chloroform, pentane, and MIBK (sample 10E).

3) With the solvent methylene chloride, a flat and unexpanded silicate sheet like the control of Example 1 was obtained. These solvents were not effective to produce a microporous silicate structure.

Pore Volume and Density

As a comparison, a flocculated sample was made, but it was permitted to dry without solvent displacement. This produced the completely collapsed sample (10D). The pore volume and density of this sample, the partially "expanded" sample 10E, and the fully expanded sample 10F were taken, and the results are given below:

TABLE 3

| Sample | Density (lb./ft$^3$) | % Pore Volume |
|---|---|---|
| 10D (totally collapsed) | 103.0 | 38.9 |
| 10E (partially open) | 23.7 | 83 |
| 10F (completely open) | 15.0 | 91.1 |

EXAMPLE 11

Using the previously described procedure, the 10 solvents tested under Example 2 were tried with films where a 0.5N calcium chloride solution had been used as the flocculant. The results obtained are given below.

11A) A fully expanded, microporous silicate structure was obtained with the following solvents: IPA, butanol, methanol, and ethanol.

11B) A partially expanded, microporous silicate structure was obtained using MEK.

11C) With the solvents methylene chloride, pentane, acetone, MIBK, and chloroform, a flat and unexpanded silicate sheet like the control of Example 1 was obtained. With calcium as the flocculating cation these solvents were not effective to produce a microporous silicate structure.

EXAMPLE 12

Using the previously described procedure, the 10 solvents tested under Example 2 were tried with films where a 0.5N magnesium chloride solution had been used as the flocculant. The results obtained are given below.

12A) A fully expanded, microporous silicate structure was obtained with the following solvents: IPA, butanol, methanol, and ethanol.

12B) A partially expanded, microporous silicate structure was obtained using MEK.

12C) With the solvents methylene chloride, pentane, acetone, MIBK, and chloroform, flat and unexpanded silicate sheets like the control of Example 1 was obtained. With magnesium as the flocculating cation, these solvents were not effective to produce a microporous silicate structure.

EXAMPLE 13

A 0.25N aqueous solution of 1,9 nonane diammonium chloride was used to prepare a series of 10 film samples according to the procedure described above. These films were tested with the different solvents indicated below by immersing them as described above. In all cases, the film produced was closer in appearance and density to the flat control film that was produced in Example 1. This result showed that the 1,9 diammonium chloride was not an effective flocculant in the solvent displacement method. It can, however, be used if the floc is to be lyophilized to produce the highly microporous silicate.

The following solvents were tested with the 1,9 nonane diammonium flocculant: pentane; methylene chloride, acetone, chloroform, methanol, ethanol, methylethylketone (MEK), ispropanol (IPA), butanol, and methylisobutylketone (MIBK).

EXAMPLE 14

This example describes the lyophilization technique for preparing microporous layered silicate bodies. A wet BDA exchanged vermiculite film (2½"×3½"×10 mils thick) was prepared as described in Example 1. After washing in deionized water, the sample was placed on a stainless steel tray and inserted into an FTS freeze drying chamber. The tray temperature was reduced to approximately −40° C. by means of a recirculating heat exchange fluid. After the the temperature had stabilized, the pressure inside the chamber was reduced to approximately 0.150 Torr. The sample was then gradually warmed by raising the shelf temperature. After essentially all of the water had been sublimed from the sample, the pressure inside the chamber dropped to approximately 0.050 Torr. Over a period of several hours, the sample temperature was gradually raised to ambient (22° C.). Dry nitrogen was slowly bled into the chamber to raise the pressure to atmospheric conditions, and the sample was removed.

The product was visually examined. It was observed that the product had the appearance of the product of Example 1.

Measurements of this sample produced the following:

| Thickness - mils. | 10 |
|---|---|
| Density - lbs/ft$^3$ | 13.8 |
| Pore Volume - % | 91.7 |

EXAMPLE 15

Using the procedure described previously, vermiculite films were prepared from the 12% solids dispersion. Samples b-e were flocculated as indicated below:

Cation Solution a) none, vermiculite dispersion only
b) 0.25 N 1,4-butanediammonium chloride (BDA)
c) 0.5 N 1,6-hexanediammonium chloride (HDA)
d) 0.5 N potassium chloride
e) 0.25 N 1,9-nonanediammonium chloride (NDA)

Except for the non-flocculated sample (i.e dispersion only), all of the films were washed thoroughly in deionized water. A portion of each film was simply air dried and serves as the control for each cation. The other portion of each film was lyophilized following essentially the same procedure described in Example 14. Thickness and density measurements of the products were taken and the results are summarized below:

TABLE 4

| Sample Description | Thickness (mils) | Density (lbs/ft$^3$) |
| --- | --- | --- |
| a) non-flocculated; control | 0.9 | 134.8 |
| non-flocculated; lyophilized | 13 | 10.2 |
| b) BDA; control | 1.2 | 98.0 |
| BDA; lyophilized | 11 | 10.2 |
| c) HDA; control | 1.2 | 95.5 |
| HDA; lyophilized | 11.8 | 10.0 |
| d) Potassium; control | 1.3 | 107.2 |
| Potassium; lyophilized | 10.5* | 11.6 |
| e) NDA; control | 1.2 | 98.8 |
| NDA; lyophilized | 12 | 9.6 |

*very soft film

EXAMPLE 16

This example shows that displacement of the water in the dispersion can be done in the vapor phase instead of by immersion.

A film was prepared as is in Example 1, and it was then suspended in a chamber above a liquid reservoir of boiling acetone. The wet film (10 mil thickness) was exposed to the hot vapors of the acetone at a temperature of 133° F. and for a period of approximately 15 minutes. The sample was then removed from the chamber and dried. The dried sample was similar in appearance to the product of Example 1.

The vapor-displaced product had a final thickness of 11.2 mils and a density of 11.4 lbs/ft$^3$.

EXAMPLE 17

The following shows the preparation of thicker samples using a multiple film casting technique. Thermal conductivity measurements were made and are shown below. Part A shows the Thermal Conductivity of the highly microporous ("puffed") silicate as it is measured perpendicular to the plane of the sheet in the Z direction. (The X-Y plane is horizontal through the sheet.) Part B shows the Thermal Conductivity as it was measured in the X-Y plane, thus showing what the thermal conductivity is going in the X or Y directions.

Part A) Following the procedure of Example 1, a 10 mil wet vermiculite film was cast onto a glass plate and cation exchanged in a 0.25 N solution of 1,4 butanediammonium chloride (BDA) in water. The film was then washed in deionized water and blotted free of excess surface water. Using the same drawdown procedure, a second film was cast onto the first film and then exchanged in the BDA solution. This process was repeated an additional 8 times and then the multilayer film structure was steeped in an acetone bath several times and then finally air dried. A rigid board with a thickness of 108 mils and a density of 13.2 lbs/ft$^3$ was obtained.

In order to measure the thermal conductivity, a second such sample was prepared and had a thickness of 109 mils and a density of 12.9 lbs/ft$^3$. Using a thin foil calorimeter method (ASTM C-114), the thermal conductivity of the samples was measured as a function of temperature. The results are summarized in Table 5.

TABLE 5

The Thermal Conductivity of a Microporous Vermiculite Film Structure as a Function of Temperature (measured in Z direction)

| Temperature (°F.) | Thermal Conductivity (Btu-in/h-ft$^2$-F) |
| --- | --- |
| 74.9 | 0.349 |
| 207.9 | 0.347 |
| 616.6 | 0.370 |
| 616.4 | 0.356 |
| 816.9 | 0.397 |
| 818.3 | 0.358 |
| 1023.9 | 0.396 |

NOTE: The data shown above in Table 5 demonstrates a particularly desirable and unique characteristic of the present compositions. The thermal conductivity stays very constant over the temperature range tested (from about 75 to about 1025° F.). Low values are also noted for this wide temperature range.

Desirable characteristics for insulative materials are 1) having the lowest values possible for thermal conductivity ("thermal K") at any particular temperature setting, and 2) keeping the values of thermal K consistently low and uniform over the temperature range expected to be encountered in use. With regard to this, it can be appreciated from the above data that the present, highly microporous silicate compositions are superior even when compared to other vermiculite materials.

Part B) Six samples of the microporous vermiculite having a size of 3" by 9" by 0.100" thick were prepared. From these samples, 220 strips 3" in length and 5/16" in width were cut. Two "picture frame" mounting fixtures having outside dimensions of 4" by 6" and inside dimensions of 3" by 5" were cut from a ceramic type ceiling material. The thickness of each of the ceramic fixtures was approximately ¼". A total of 110 strips each 3" by 5/16" by 0.100" were carefully placed on edge within each fixture and perimeter bonded to the fixture using a contact adhesive.

Both surfaces were lightly sanded to provide uniform samples ¼" in thickness.

Using the method indicated for part A, the thermal conductivity was again measured as a function of temperature and the data are summarized in Table 6. In this case however, due to the special orientation of the samples, the thermal conductivity is measured along the X-Y plane rather than in the Z direction (perpendicular to the X-Y plane, which is the usual measurement mode).

TABLE 6

Thermal Conductivity as a Function of Temperature (in the X-Y plane)

| Temperature (°F.) | Thermal Conductivity (Btu-in/h-ft$^2$-F) |
| --- | --- |
| 74.2 | 1.159 |

TABLE 6-continued

Thermal Conductivity as a Function of Temperature (in the X-Y plane)

| Temperature (°F.) | Thermal Conductivity (Btu-in/h-ft²-F) |
| --- | --- |
| 208.9 | 1.139 |
| 415.5 | 1.307 |
| 616.4 | 1.467 |
| 816.2 | 1.586 |
| 017.2 | 1.708 |

EXAMPLE 18

Strings of spaghetti-like microporous vermiculite were prepared in the following manner:

The vermiculite dispersion of Example 1 was pumped thru an ⅛ inch diameter orifice at a rate of approximately 120 ml./min. and into a hardening bath consisting of a 0.25N solution of 1,4 butanediammonium chloride (BDA). The orifice was positioned approximately 2" above the surface of the bath. Short spaghetti-like segments approximately ⅛" in diameter and ½" to 1" in length were formed. The strings were washed 6 times with hot deionized water, decanted and rinsed 4 times in acetone. The acetone was decanted off and the strings were dried on a Teflon sheet. The final dried strings are of a shape and size comparable to what is initially formed in the BDA bath. The microporous, vermiculite strings so produced are suitable as a pour-in-place loose fill insulation.

EXAMPLE 19

The procedure of Example 18 was followed but after the fourth rinse in acetone, the strings (in acetone) were chopped in an explosion-proof, high speed blender for 15 minutes. The vermiculite particles were then further size reduced by passing the mixture through a Microfluidizer TM device.

In order to form molded structures, this material was then cast in molds using the following procedure. The mixture containing 5% by weight of vermiculite particles was poured into two molds 4½" by 6½" to a depth of approximately ⅛".

After the acetone had evaporated, the samples were removed from the molds. The samples were measured at 129 mils thick and a density of 17.3 lbs/ft³ and 115 mils thick and a density of 17.8 lbs/ft³. Pore size measurements for these materials were also taken. It was determined that in these samples, about 80% of the pore volume was in pores having pore diameters in the range of from about 1 to about 10 microns and about 20% of the pores had diameters less than about 1 micron.

Thermal conductivity was determined as before. The data are summarized in Table 7.

TABLE 7

Thermal Conductivity of a Cast and Molded Microporous Flocculated Silicate Sheet Measured at Varying Temperatures

| Temperature (°F.) | Thermal Conductivity (Btu-in/h-ft²-F) |
| --- | --- |
| 79.5 | 0.491 |
| 208.3 | 0.418 |
| 416.2 | 0.431 |
| 618.6 | 0.468 |
| 818.2 | 0.496 |
| 1003.7 | 0.541 |

EXAMPLE 20

Following the procedure of Example 1, 22 pieces 4½" by 6½" by 10.5 mils thick were prepared. One surface of each film was coated with a 10% solution of a silicone pressure sensitive adhesive (Dow Corning Q27406) in xylene. Two sets of samples were prepared by stacking 11 such films face to back. The outermost film sample was left uncoated. The stack of 11 films was placed into a hydraulic press and squeezed with 110 mil shims surrounding the sample. The temperature was raised to 100° F., 200° F., and 300° F. and held at at each temperature for 30 minutes and then taken up to 400° F. for one hour. The press was cooled down and the sample then removed. A second sample was then prepared following the identical procedure. Both samples were trimmed to a nominal 4" by 6" required for thermal conductivity testing. The data are summarized in the table below.

TABLE 8

Thermal Conductivity of Adhesive Bonded Microporous Vermiculite Film Laminates

| Temperature (°F.) | Thermal Conductivity (Btu-in/h-ft²-F) |
| --- | --- |
| 81.4 | 0.368 |
| 208.6 | 0.371 |
| 414.3 | 0.413 |
| 616.9 | 0.446 |
| 818.5 | 0.511 |
| 996.8 | 0.523 |

What is claimed is:

1. A process for the preparation of a porous lamellar structured 2:1 layered silicate material comprising flocculating an aqueous dispersion of chemically delaminated lamellae which are selected from the group consisting of mica and vermiculite, with a cationic flocculant which gives the lamellae interlayer cations and, with the lamellae, forms a floc which has an aqueous liquid medium, contacting the floc with a displacement solvent that has at least some miscibility with the aqueous liquid medium whereby the displacement solvent mixes with and extracts the aqueous liquid medium from the floc and drying the floc to leave the lamellae arranged in a lamellar structure, further providing that the lamellae do not collapse so that after the displacement solvent is removed in drying the lamellar structure is left with a pore volume greater than about 60%.

2. The process of claim 1 wherein the displacement solvent is a vapor when it contacts and extracts the aqueous liquid from the dispersion, and drying is performed to remove from the lamellae, residual displacement solvent which mixed into the dispersion while the displacement solvent vapor contacted it.

3. The process of claim 2 wherein the displacement solvent vapor is selected from the group consisting of alcohol, methylethyl ketone, methyl isobutyl ketone, and acetone.

4. The process of claim 1 wherein before contacting the floc with the displacement solvent the floc is comminuted by agitation, and then is cast into a mold.

5. The process of claim 1 wherein after the aqueous liquid medium is extracted, but before drying is done to remove the displacement solvent, the floc is comminuted and is then cast into a mold, followed by drying.

6. The process of claim 1 wherein the flocculated, chemically delaminated silicate lamellae were flocculated by a cationic flocculant selected from the group consisting of a metal and a diamine that had 7 or less carbon atoms per molecule, and wherein the displacement solvent was an alcohol having up to 5 carbon atoms per molecule.

7. The process of claim 1 wherein the displacement solvent is selected from the group consisting of alcohol, methylethyl ketone, methyl isobutyl ketone, and acetone.

8. A process for the preparation of a porous lamellar-structured 2:1 layered silicate comprising lyophilizing a dispersion of chemically delaminated silicate lamellae, the said silicate lamellae being selected from the group consisting of mica and vermiculite lamella, further providing that the said dispersion has an aqueous liquid medium, whereby the aqueous liquid medium is removed leaving the silicate lamellae in a lamellar-structure having a pore volume greater than about 60%.

9. The process of claim 8 in which the lamellae have been flocculated before lyophilizing.

10. A microporous, 2:1 layered silicate composition comprising a porous, lamellar structure of chemically delaminated silicate lamellae in which the lamellae are selected from the group consisting of mica and vermiculite, wherein the lamellar structure has a single lamella which form walls of pores in the structure and wherein the lamellar structure has a pore volume greater than about 60%, with at least about 70% of that volume being in pores having a diameter less than about 100 microns, wherein further the chemically delaminated silicate lamellae were arranged in a liquid which was removed without causing a collapse of the lamellae to produce the lamellar structure.

11. The composition of claim 10 wherein the pore volume is in the range of from about 88% to about 95%.

12. The composition of claim 10 which has at least about 45% of its pore volume in pores having a diameter less than about 12 microns.

13. The composition of claim 10 having a porosity of at least about 75%.

14. Heat insulation comprising a porous, lamellar structure of chemically delaminated 2:1 layered silicate lamellae in which the lamellae are selected from the group consisting of mica and vermiculite, wherein the lamellar structure has single lamella which form walls of pores in the structure and where the lamellar structure has a pore volume greater than about 60% with at least about 10% of this pore volume in pores which, in at least one direction, have a diameter in the range of from about 0.05 to about 0.3 microns.

15. The heat insulation of claim 14 which has at least about 65% of the pore volume in pores having a diameter which is less than about 12 microns.

16. The heat insulation of claim 14 wherein the porous, lamellar structure is in the form of a sheet.

17. The heat insulation of claim 14 which is anisotropic.

18. The heat insulation of claim 14 having a porosity of at least about 88%.

19. The heat insulation of claim 14 which is a shaped piece.

20. The heat insulation of claim 14 which is either a pipe covering or a furnace covering.

* * * * *